United States Patent [19]

Sparlin et al.

[11] 3,940,612

[45] Feb. 24, 1976

[54] METHOD FOR DETECTING AND LOCATING WATER-PRODUCING ZONES AND/OR WATER THIEF ZONES IN SUBTERRANEAN FORMATIONS

[75] Inventors: Derry D. Sparlin; Walter H. Fertl, both of Ponca City, Okla.; Gary C. Young, Pinole, Calif.

[73] Assignee: Continental Oil Company, Ponca City, Okla.

[22] Filed: Oct. 4, 1974

[21] Appl. No.: 512,831

[52] U.S. Cl. ............................... 250/260; 250/258
[51] Int. Cl.² ........................................ G01V 5/00
[58] Field of Search..................... 250/258, 259, 260

[56] References Cited
UNITED STATES PATENTS

| | | | |
|---|---|---|---|
| 2,352,993 | 7/1944 | Albertson | 250/260 |
| 2,364,975 | 12/1944 | Heigl et al. | 250/260 |
| 2,390,931 | 12/1945 | Fearon | 250/260 |
| 2,904,112 | 9/1959 | Wiley | 250/260 |
| 3,070,696 | 12/1962 | McEwen | 250/260 |
| 3,851,171 | 11/1974 | Saniford et al. | 250/260 |

*Primary Examiner*—Harold A. Dixon
*Attorney, Agent, or Firm*—F. Lindsey Scott

[57] ABSTRACT

A method for locating water-producing zones and/or water thief zones in a subterranean formation penetrated by a well bore comprising the sequential steps of:

a. injecting into said formation an aqueous solution containing from about 0.01 to 7.5 weight percent of an irradiated water soluble compound, said compound having preferential silica adsorptive characteristics;

b. passing radioactivity detection means through the well bore and recording the measurement of radioactivity;

c. returning the reservoir or injection well to normal production or normal water injection;

d. passing said radioactivity detection means through the well bore and recording the measurement of radioactivity of said formation; and, e. comparing the measurements of radioactivity to determine water producing zones and/or water thief zones.

12 Claims, No Drawings

METHOD FOR DETECTING AND LOCATING WATER-PRODUCING ZONES AND/OR WATER THIEF ZONES IN SUBTERRANEAN FORMATIONS

BACKGROUND OF THE INVENTION

1. Field of the Invention

The present invention relates to a method for detecting and locating water-producing zones and/or water thief zones in a subterranean formation penetrated by a well bore. More specifically, the invention is directed to a method for detecting and locating such water-producing zones and/or water thief zones in subterranean hydrocarbon-containing formations employing radioactive injection techniques in combination with radioactive well logging techniques wherein the material being injected into the formation is an aqueous solution containing an irradiated water soluble compound, said compound having preferential silica adsorptive characteristics.

2. Brief Description of the Prior Art

In the production of hydrocarbon from a subterranean formation one often encounters excessive water production resulting from high water producing zones in the formation or, when employing secondary recovery techniques, water thief zones in the subterranean formation. In order to achieve the desirable production of the hydrocarbon from the formation, whether the same be primary production or secondary recovery production, one must identify and locate the water producing zones and/or water thief zones in the formation so that such zones can be remedially treated to substantially eliminate excess water production, or water losses.

In the past, various methods have been proposed such as the use of radioactive tracers to follow movement of gas, oil, and water in such subterranean formations. Such prior art methods have utilized many different materials such as dyes, chemical compounds, helium, carbon monoxide, and radioactive isotopes. In addition, many of such prior art methods have employed compounds involving expensive equipment, excessive shut down procedures and highly specialized equipment. Further, care must be exercised to prevent over-contamination of the formation which results in long periods of inactivity of the formation. Many of the prior art techniques have employed the use of compositions which tend to alter the permeability characteristics of the formation. Thus, the oil industry has long sought an economical, simple method to detect and locate water producing zones and/or water thief zones in subterranean hydrocarbon bearing formations.

OBJECTS OF THE INVENTION

An object of the present invention is to provide a method for detecting water producing zones and/or water thief zones in subterranean hydrocarbon bearing formations.

Another object of the invention is to provide an economical, simple method for detecting and locating water producing zones and/or water thief zones in hydrocarbon bearing subterranean formations which does not suffer from the limitations of prior art techniques.

These and other objects, advantages and features of the present invention will be readily apparent to those skilled in the art from reading the following detailed description.

SUMMARY OF THE INVENTION

According to the present invention we have now discovered an improved method for locating water producing zones and/or water thief zones in subterranean hydrocarbon bearing formations. More specifically, we have found an improved technique for locating and determining the direction of movement of water through a subterranean formation employing the injection of water soluble radioactive compounds in conjunction with radioactive well logging techniques.

Specifically, the method for detecting and locating water-producing zones and/or water thief zones in a subterranean formation penetrated by a well bore includes the sequential steps of a. injecting into said formation an aqueous solution containing from about 0.01 to 7.5 weight percent of an irradiated water soluble compound, said compound having preferential silica adsorptive characteristics;

b. passing said radio activity detection means through the well bore and recording the measurement of radioactivity;

c. returning the reservoir to normal production or the water injection wells to normal injection flows, as the case may be;

d. passing said radioactivity detection means through the well bore and recording the measurement of radioactivity of said formation; and, e. comparing the measurements of radioactivity to determine water producing zones and/or water thief zones.

DESCRIPTION OF THE PREFERRED EMBODIMENTS

This invention is based upon the discovery that by injecting an irradiated water soluble compound having preferrential silica adsorptive characteristics into a subterranean hydrocarbon bearing formation one can, by employing radioactive detection means, detect and locate water producing zones and/or water thief zones in a subterranean formation. As is well known in the production of hydrocarbons, subterranean hydrocarbon bearing formations are often intermediate water-containing formations. When excessive water is detected in the produced hydrocarbon, one suspects that channelling or fracturing has occurred in the formation thereby allowing water to move through such defects to the point of production. Likewise, when employing secondary recovery techniques where water flooding is employed fingering of the formation often leads to an excess amount of water in the hydrocarbon production. When one encounters such excess water, whether employing primary or secondary hydrocarbon recovery techniques, one must determine the source of such water so that the water producing formations can be sealed to prevent the production of the excess water. Many methods are known in the industry for sealing off and repairing such subterranean formations. However, in order to reduce the expense and minimize the loss of production time, it is imperative that one be readily able to detect and locate the source of such water prior to employing the necessary remedial steps.

When it is determined that excess water is being produced, the production of the producing well is stopped. In the case of water injection wells when excessive water losses are encountered the injection of such water is stopped. A radioactivity detection means is then optionally passed through the well bore to record the measurement of radioactivity of the radioactive material in the subterranean formation. The logging data obtained serves as a base or reference log for comparison with future logs made during th investigation to accurately detect and locate water-producing zones and/or water thief zones in the subterranean hydrocarbon bearing formation. In many instances it is not necessary to measure the naturally occurring radioactivity in the formation although in some formations it is desirable that the naturally occurring radioactivity be measured.

After the reference or base log has been obtained, an aqueous solution containing from about 0.01 to 7.5 weight percent of an irradiated water soluble compound, said compound having preferential silica adsorptive characteristics, is injected into the formation at predetermined locations. It is often desirable that the area under investigation be temporarily sealed off so that the section of the well bore containing perforated portions can be pressured so that formation pressure is overcome and the aqueous solution containing the radioactive compound can readily be dispersed into the formation. Any suitable method of sealing off the desired portion of the well bore can be employed such as packer means which can optionally be a part of the injector employed to inject the aqueous solution into the formation.

Once the aqueous solution containing the irradiated water soluble compound has been injected into the formation, and a sufficient amount of time has elapsed to insure that the radioactive compound has been dispersed throughout the formation, the radioactive detection means is again passed through the well bore to record the measurement of radioactivity of the solution treated formation. The same type of radioactivity detection mean employed to obtain the base log or reference log is also used to record the measurement of radioactivity of the solution treated formation to facilitate comparison of measurements. When one has employed the use of sealing means and a radioactive injector means, it is often desirable that such means be removed prior to the employment of the radioactivity detection means as stated above.

After the logging data is obtained the well is returned to normal use for a period of time to allow production of the formation, or injection of water into the formation when employing a water injection well. The irradiated water soluble compounds having the preferential adsorptive characteristics for silica which have been deposited on the formation are produced, along with water, thereby causing a deterioration of the radioactivity in water producing area. The water producing zones or formations can then be detected by the use of subsequent logging data obtained on the formation. Once the subsequent logging measurement has been obtained by passing a radioactivity detection means through the well bore, such data is compared with the previously obtained data and the comparative results determine the water producing zones and/or water thief zones present in the formation.

As previously stated, an essential aspect of the present invention is the injection into the subterranean formation of an aqueous solution containing from about 0.01 to 7.5 weight percent of an irradiated water soluble compound, said compound having preferential silica adsorptive characteristics. Examples of suitable compounds which can be employed and which possess these desired characteristics are sodium silicate, water soluble polymers, and biopolymers.

The term water-soluble polymers as used herein is understood to mean polyethylene oxide, polyacrylamide, polyacrylicacid, copolymers of polyacrylates, and the like.

The term biopolymer as used herein refers to biopolysaccharides which are produced by bacteria of the genus Xanthomonas from carbohydrates, usually glucose. This material is described in numerous patents and publications. For example, descriptions may be found in U.S. Pat. Nos. 3,729,460 and 3,516,983, the disclosures of which are made a part of the subject disclosure. One suitable biopolymer is B-1459, which is described in detail in U.S. Pat. No. 3,373,810, which patent is made a part of this disclosure.

The term "Xanthan gum" is also used to describe the bacterially derived polysaccharides which are used in our invention.

A particularly suitable polysaccharide is commercially available under the trade name "Kelzan" from the Kelco Company, San Diego, California. Kelzan has the following physical properties:

| | |
|---|---|
| Physical State | Dry, white powder |
| Moisture Content | 12% |
| Ash | 10% |
| Specific Gravity | 1.6 |
| Bulk Density (1/cu ft) | 52.4 |
| Browning Temperature °C | 160 |
| Charring Temperature °C | 270 |
| Ashing Temperature °C | 470 |
| Heat of Combustion, Cal/g | 3.48 |
| Nitrogen | 1.2% |
| As a 1% Solution (distilled water: | |
| Heat of Solution (Cal/g soln | 0.055 |
| Refractive Index (20°C) | 1.3332 |
| pH | 6.8 |
| Surface Tension (dynes/cm) | 75 |
| Viscosity (60 rpm Brookfield LVF) | 850 |
| Freezing Point °C | 0.0 |

While any suitable water-soluble compound having preferential silica adsorptive characteristics can be employed especially desirable results are obtained when such compound is sodium silicate.

While any suitable radioactive isotope can be employed to radiate such water-soluble compounds, the most desirable results are obtained when one selects such an isotope based upon its half life, and its requirement to emit gamma radiation. Suitable isotopes which can be employed are Iodine 13, Krypton 85, Carbon 14, Hydrogen 3, Iridium 192 and Zirconium Niobium 95.

As previously indicated, the amount of such irradiated water-soluble compound employed in the aqueous solution can vary widely. However, desirable results have been obtained wherein the irradiated chemical compound is present in the amount of 0.05 to 3 weight percent. The particular amount employed will vary somewhat depending upon the particular type of water-soluble compound employed, a requirement being that one must insure that the amount of compound employed in the aqueous solution does not substantially alter the permeability characteristics of the formation under investigation. For example, when employing water-soluble polymers, one employs a solution containing amounts in the lower range, e.g. from about 0.05 to about 1 weight percent; whereas, when sodium silicate is employed one can readily employ a solution containing from about 1 to 3 weight percent of irradiated compound. When sodium silicate is employed as a water-soluble compound, especially desirable results are obtained when it is irradiated with a radioactive isotope selected from the group consisting of Iridium 192, Zirconium-Niobium 95 and Iodine 131.

Upon locating and identifying the water-producing zones and/or water thief zones in the formation, remedial means known to those skilled in the arts are used to repair and seal such defects in the formation and thus stop the flow of excess water from the water-producing zones or into the thief zones. Once the desired remedial steps have been taken, it is often desirable to repeat the steps of the method of the present invention, i.e., obtaining measurements of radioactivity present in the formation, injecting an aqueous solution containing the water-soluble irradiated compound into the formation at substantially the same locations and obtaining radioactivity measurements of the solution treated formation so that upon comparison of the additional logs one can readily determine if the remedial steps taken to eliminate the production of excess water have been effective.

While certain preferred embodiments as to the particular radioactivity detection means, the aqueous solution containing the irradiated water-soluble compound having preferential adsorptive characteristics for silica, and the like are as set forth in the above referred embodiments, it should be evident to those skilled in the art that certain modifications of the present invention can be made without departing from the scope of the invention which is defined in the appended claims.

Having thus described the invention, we claim:

1. A method for detecting and locating water-producing zones in a subterranean formation penetrated by a well bore which comprises:
   a. injecting into said formation an aqueous solution containing from about 0.01 to 7.5 weight percent of an irradiated water soluble compound selected from the group consisting of sodium silicate, water-soluble polymers, and polysaccharides produced by bacteria of the genus Xanthomonas on carbohydrates, said compound having preferential silica adsorptive characteristics;
   b. passing said radioactivity detection means through the well bore and recording the measurement of radioactivity;
   c. returning the reservoir to normal production;
   d. passing said radioactivity detection means through the well bore and recording the measurement of radioactivity of said formation; and,
   e. comparing the measurements of radioactivity to determine water producing zones.

2. The method of claim 1 wherein said water-soluble polymers are selected from the group consisting of polyethylene oxide, polyacrylamide, polyacrylic acid and copolymers of polyacrylates.

3. The method of claim 2 wherein said irradiated compound is produced by irradiating said water-soluble compound with a radioactive isotope selected from the group consisting of Iodine 131, Krypton 85, Carbon 14, Hydrogen 3, Iridium 192 and Zirconium-Niobium 95.

4. The method of claim 2 wherein said aqueous solution contains from about 0.05 to 3 weight percent of said irradiated chemical compound.

5. The method of claim 4 wherein said water-soluble compound is sodium silicate and is present in an amount of from about 1 to 3 weight percent and said sodium silicate is irradiated with a radioactive isotope selected from the Group consisting of Iridium 192, Zirconium - Niobium 95 and Iodine 131.

6. The method of claim 1 wherein a radioactivity detection means is passed through said well bore to measure the radioactivity in said formation prior to injecting said aqueous solution of (a).

7. A method for detecting and locating injection water thief zones in a subterranean formation penetrated by a well bore of an injection which comprises:
   a. injecting into said formation an aqueous solution containing from about 0.01 to 7.5 weight percent of an irradiated water soluble compound selected from the group consisting of sodium silicate, water-soluble polymers, and polysaccharides produced by bacteria of the genus Xanthomonas on carbohydrates, said compound having preferential silica adsorptive characteristics;
   b. passing said radioactivity detection means through the well bore and recording the measurement of radioactivity;
   c. returning the injection well to normal water injection;
   d. passing said radioactivity detection means through the well bore and recording the measurement of radioactivity of said formation; and,
   e. comparing the measurements of radioactivity to determine injection water thief zones.

8. The method of claim 7 wherein said water-soluble polymers are selected from the group consisting of polyethylene oxide, polyacrylamide, polyacrylic acid and copolymers of polyacrylates.

9. The method of claim 8 wherein said irradiated compound is produced by irradiating said water-soluble compound with a radioactive isotope selected from the group consisting of Iodine 131, Krypton 85, Carbon 14, Hydrogen 3, Iridium 192 and Zirconium-Niobium 95.

10. The method of claim 7 wherein said aqueous solution contains from about 0.05 to 3 weight percent of said irradiated chemical compound.

11. The method of claim 9 wherein said water-soluble compound is sodium silicate and is present in an amount of from about 1 to 3 weight percent and said sodium silicate is irradiated with a radioactive isotope selected from the group consisting of Iridium 192, Zirconium-Niobium 95 and Iodine 131.

12. The method of claim 7 wherein a radioactivity detection means is passed through said well bore to measure the radioactivity in said formation prior to injecting said aqueous solution of (a).

* * * * *